Jan. 11, 1938.  N. C. SCHLEGEL  2,105,164
WEATHER STRIPPING
Filed Dec. 16, 1936
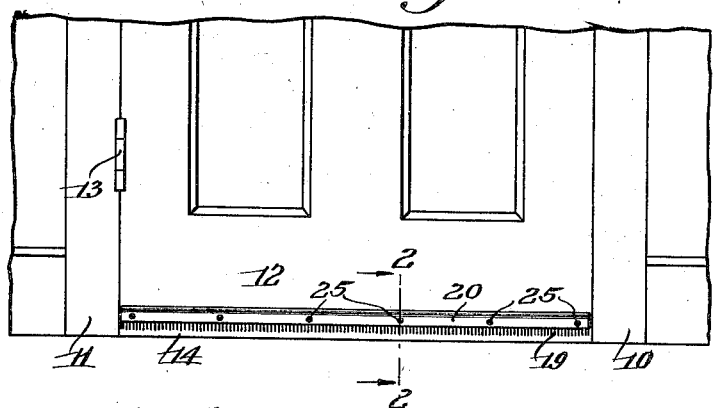
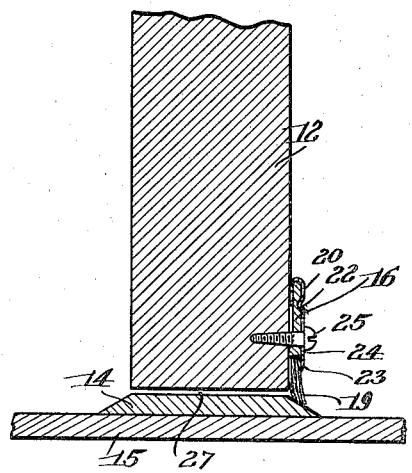
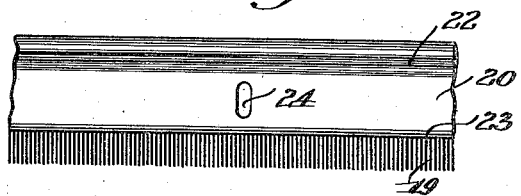
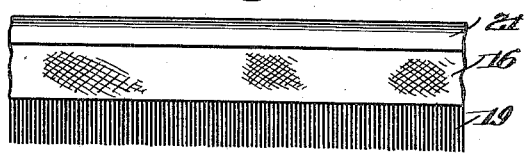
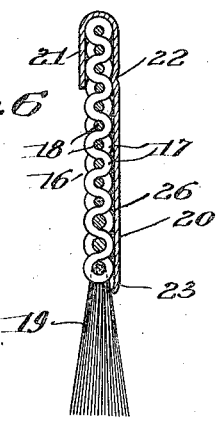
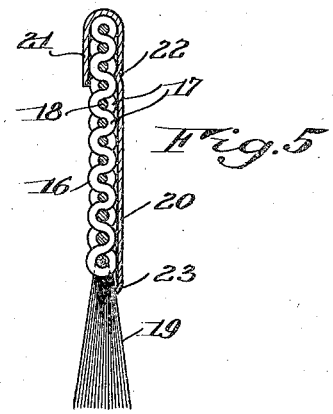
INVENTOR.
Norman C. Schlegel
BY Cumpston & Shepard
his ATTORNEYS Patented Jan. 11, 1938

2,105,164

UNITED STATES PATENT OFFICE 2,105,164

WEATHER STRIPPING

Norman C. Schlegel, Rochester, N. Y., assignor to The Schlegel Manufacturing Company, Rochester, N. Y., a corporation of New York Application December 16, 1936, Serial No. 116,169

2 Claims. (Cl. 20—69)

The present invention relates to weather stripping for use on doors, windows and various other closures such, for example, as the doors or windows of automobiles, air and water craft, houses and other structures.

One object of the invention is to provide an improved and efficient form of weather stripping which is capable of maintaining its shape and resisting wear for relatively long periods and which can be manufactured at a relatively low cost and readily applied to various structures.

A further object of the invention is to provide improved weather stripping of the class described including a supporting section having at one edge thereof relatively stiff resilient fibers which will effectively seal the space between the adjacent edges of two cooperating members such, for example, as a door or window and the framework defining an opening therefor.

A further object of the invention is to provide a unitary weather strip of the class described capable of effectively excluding air, rain, dust and the like from the parts to be protected, and having improved mounting means designed to facilitate ready application of the strip to said parts.

A further object of the invention is to provide a weather strip comprising a flexible body section such, for example, as a woven textile strip having a sealing portion formed of relatively stiff resilient pile connected with and forming a continuation of one of the longitudinal edges of the flexible body section and disposed substantially in the plane thereof.

To these and other ends the invention resides in certain improvements and combinations of parts, all as will be hereinafter more fully described, the novel features being pointed out in the claims at the end of the specification.

In the drawing:

Fig. 1 is a view in elevation showing the application of the weather stripping to the bottom of a door;

Fig. 2 is a sectional elevation on line 2—2 of Fig. 1 drawn to an enlarged scale;

Fig. 3 is a side elevation of the weather strip shown in Fig. 2 as viewed from the outside thereof;

Fig. 4 is a similar view showing the inner face of the strip;

Fig. 5 is a transverse section through the strip drawn to an enlarged scale, and Fig. 6 is a similar transverse section in which the woven portion of the strip is shown united to the metal backing by means of cement.

The same reference numerals throughout the several views indicate the same parts.

Referring to Fig. 1 of the drawing, there is shown oppositely disposed frame members 10 and 11 between which is positioned a door or closure 12 hinged at 13 to the frame member 11. At the bottom of the door is the usual threshold plate 14 disposed on a floor 15, as shown in Fig. 2. The weather stripping shown applied to the bottom of the door is illustrated in Figs. 3 to 6, inclusive, that shown in Fig. 6 being a modification of that shown in Fig. 5.

The weather stripping comprises a body section 16 which may be of resilient material or of flexible or semi-flexible material, such as felt or woven textile fabric of any suitable kind. Preferably the section constitutes a textile body section woven from weft strands 17 and warp strands 18 indicated diagrammatically in Fig. 5. Some or all of the weft strands may be formed of metallic wire for the purpose of stiffening the body section while some or all of the weft strands may be of any suitable non-metallic material such, for example, as cotton or linen.

The sealing portion of the strip is diagrammatically indicated at 19 and constitutes a brush-like portion formed of densely related resilient fibers formed of any suitable material. Preferably, however, the sealing portion is formed of relatively long stiff pile connected with the body section in any suitable manner. In the present disclosure the pile fibers are woven into one of the longitudinal edge portions of the body section 16. It will be noted that the sealing portion 19 of the strip forms a direct continuation of one of the side edges of the woven body section and that said portion lies substantially within the plane of the body section.

The body section is provided with a mounting and protecting member 20, preferably in the form of a metal strip overlying the outer face of the body section, as shown in Fig. 5, and having an edge portion 21 extended around the edge of the body section and bent down on the inner face thereof in clamping engagement therewith whereby to secure the body section upon the mounting member. To further secure the body section upon the mounting member the latter has an inwardly offset rib-like portion 22 extending the full length of the mounting member and directly opposite the inwardly turned edge portion 21 thereof. Said rib-like portion serves to slightly compress the material of the body section whereby to better secure the outer edge portion thereof within the channel formed by bending the outer edge of the mounting strip upon itself.

The lower edge 23 of the mounting member is preferably extended over the sealing portion 19 of the strip a slight distance, as shown in Fig. 5, thus completely covering and protecting the woven body section, the inner face of which is positioned next to the door or closure 12 as shown in Fig. 2, so that no portion of the body section is exposed to view. Furthermore, since the body section 16 is entirely enclosed by the mounting member and the door it is protected from the weather and from dust and dirt which would accumulate thereon if the section were left exposed. The mounting member is provided with a plurality of transversely extending elongated openings 24 through which to extend the screws 25 for attaching the weather strip to the door or closure, as shown in Fig. 2.

The weather strip shown in Fig. 6 is the same as that shown in Fig. 5, except that the weft strands of the body section 16 are preferably formed of non-metallic material, and with the further exception that a binding material, such as a suitable cement, indicated at 26, is interposed between the mounting member 20 and the body section 16 to stiffen the latter and to secure it upon the mounting member.

When the weather stripping is applied to the bottom of a door the sealing portion 19 of the strip is extended below the edge of the door into engagement with the threshold plate, as shown in Fig. 2, whereby the space 27 will be tightly sealed and protected against the passage of air, dirt, or dust which might be blown therethrough if the space were left unprotected.

When the door or window is in closed position the sealing portion 19 of the strip will be somewhat compressed in which case the pile fibers will be slightly bent or deflected to afford a dense protecting surface in contact with the frame or other part with which the closure cooperates, thus effectively sealing the space between said parts, it being understood that as soon as the pressure on the weather stripping is released that the resilient pile fibers will spring back to normal position.

While only one application of the weather stripping has been illustrated it will be understood that the strip can readily be applied to various closure members, and in some forms of construction to the frame or similar members with which the closure members are associated, whereby to seal the space between said members.

It will be understood that the terms "frame" or "frame member" employed in the specification and claims may constitute a portion of window casing or door jamb or any other border member intended to outline an opening to be protected by the door, window, or closure mentioned herein.

I claim:

1. Weather stripping for sealing the space between cooperating closure and frame members, comprising a flexible body section for attachment to one of said members in substantially parallel relation thereto, and a sealing portion for engagement with the other of said members, said sealing portion forming a continuation of one of the side edges of said body section in the plane of said section and comprising relatively long stiff pile for yieldingly engaging the last mentioned member.

2. Weather stripping for sealing the space between cooperating closure and frame members, comprising a flexible woven body section having a brush-like sealing section substantially in the plane thereof and forming a direct continuation of one of the side edges of said body section, said brush-like section comprising relatively long stiff pile interwoven with said body section and adapted to yieldingly engage one of said members, and a mounting strip for supporting said body section on the other of said members disposed on and substantially paralleling one side of said body section and having its inner edge terminating adjacent the portion of the body section from which the sealing section extends so that a substantial portion of said sealing section is left free to yield and be deflected upon contacting the member to be engaged thereby during movement of the closure member to final closing position.

NORMAN C. SCHLEGEL.